(12) United States Patent
Katusic et al.

(10) Patent No.: US 7,465,431 B2
(45) Date of Patent: Dec. 16, 2008

(54) NANOSCALAR PYROGENICALLY PRODUCED YTTRIUM-ZIRCONIUM MIXED OXIDE

(75) Inventors: Stipan Katusic, Kelkheim (DE); Günther Michael, Karlstein (DE); Klaus Deller, Hainburg (DE); Thomas Hennig, Geinhausen (DE); Susanne Reinhart, Frankfurt (DE); Andrea Tietze, Frankfurt (DE)

(73) Assignee: Degussa AG, Düsseldorf (DE)

( * ) Notice: Subject to any disclaimer, the term of this patent is extended or adjusted under 35 U.S.C. 154(b) by 209 days.

(21) Appl. No.: 10/212,823

(22) Filed: Aug. 6, 2002

(65) Prior Publication Data

US 2003/0101659 A1    Jun. 5, 2003

Related U.S. Application Data

(60) Provisional application No. 60/310,836, filed on Aug. 9, 2001.

(30) Foreign Application Priority Data

Aug. 6, 2001  (DE)  .............................. 101 38 573

(51) Int. Cl.
*C01F 17/00*  (2006.01)
(52) U.S. Cl. ..................... 423/266; 423/275; 423/263; 423/608; 501/103; 51/309; 134/2; 516/90; 524/431; 252/511
(58) Field of Classification Search ................. 423/266, 423/275, 263, 608; 501/103; 51/309; 134/2; 516/90; 524/431; 252/511
See application file for complete search history.

(56) References Cited

U.S. PATENT DOCUMENTS

| | | | |
|---|---|---|---|
| 3,725,526 A | 4/1973 | Pieri et al. | |
| 4,842,832 A | 6/1989 | Inoue et al. | |
| 5,061,474 A | 10/1991 | Pauli et al. | |
| 5,149,510 A | 9/1992 | Recasens et al. | |
| 5,188,991 A * | 2/1993 | Kriechbaum et al. | ........ 501/103 |
| 5,204,083 A | 4/1993 | Magyar et al. | |
| 5,358,695 A | 10/1994 | Helble et al. | |
| 5,599,511 A | 2/1997 | Helble et al. | |
| 5,672,230 A | 9/1997 | Park et al. | |
| 5,911,967 A | 6/1999 | Ruthner | |
| 5,958,361 A | 9/1999 | Laine et al. | |
| 6,013,591 A | 1/2000 | Ying et al. | |

FOREIGN PATENT DOCUMENTS

| | | |
|---|---|---|
| DE | 38 27 898 A1 | 2/1990 |
| EP | 0 241 647 | 10/1987 |
| EP | 0 355 481 A1 | 2/1990 |
| EP | 0 395 925 A1 | 11/1990 |
| EP | 0 450 674 | 10/1991 |
| EP | 0 609 533 A1 | 8/1994 |
| EP | 0 717 008 | 6/1996 |
| EP | 0 756 580 | 7/2000 |
| GB | 791657 | 3/1958 |
| JP | 06-199633 | 7/1994 |
| WO | WO 89/11450 | 11/1989 |
| WO | WO 94/16989 | 8/1994 |
| WO | WO 94/26657 | 11/1994 |

OTHER PUBLICATIONS

Webster's II new Riverside university dictionary, 1984, p. 959.*
European Search Report, dated Nov. 18, 2002, for European Patent Application No. 02017476.9, 4 pages.
Juarez, R. E. et al., "Synthesis of Nanocrystalline Zirconia Powders for TZP Ceramics by a Nitrate-Citrate Combustion Route," Journal of the European Ceramic Society, Feb. 2000, pp. 133-138, vol. 20, No. 2, Elsevier Science Ltd., Barking, Essex, Great Britain, 6 pages.
Grabis, J. et al., "Preparation of Nanocrystalline YSZ Powders by the Plasma Technique," Journal of Materials Science, Feb. 1, 1998, pp. 723-728, vol. 33, No. 3, Chapman and Hall Ltd., London, Great Britain, 6 pages.
Everest, D. A. et al., Preparation of Ultrafine Alumina Powders by Plasma Evaporation, Journal of Materials Science, Mar. 1971, pp. 218-224, vol. 6, No. 3, Springer, The Netherlands (XP00575150).
Database WPI, Jul. 1994, Derwent Publications Ltd., London, UK (XP002153250) JP06-199633, Abstract.
Database WPI, Jul. 1989, Derwent Publications Ltd., London, UK (XP002153251) JP01-172296, Abstract.
English language abstract of reference EP 0 609 533; Derwent Accession No. 1994-241706/199430, Mar. 1996.
English language abstract of reference EP 0 395 925; Derwent Accession No. 1990-328532/199044, Nov. 1990.
English language abstract of reference EP 0 355 481; Derwent Accession No. 1990-059792/199009, Feb. 1990.
Ullmann's Encyclopedia of Industrial Chemistry, Fifth, Completely Revised Ed., vol. A23, *Refractory Ceramics to Silicon Carbide*, pp. 635-647 (English lang.); 1993.

* cited by examiner

*Primary Examiner*—Steven Bos
(74) *Attorney, Agent, or Firm*—Robert G. Weilacher; Smith, Gambrell & Russell

(57) ABSTRACT

Nanoscalar, pyrogenically produced yttrium-zirconium mixed oxide which has a BET surface area of between 1 and 600 m²/g, a total chloride content of less than 0.05 wt. % and does not exhibit a conversion into the monoclinic phase during storage is produced by atomizing yttrium compounds and zirconium compounds and reacting them in a flame. The mixed oxide can be used as ceramic raw material.

9 Claims, 2 Drawing Sheets ical NANOSCALAR PYROGENICALLY PRODUCED YTTRIUM-ZIRCONIUM MIXED OXIDE

REFERENCE TO A RELATED APPLICATION

Provisional application 60/310,836 filed Aug. 9, 2001 is relied on and incorporated herein by reference.

INTRODUCTION AND BACKGROUND

This invention relates to nanoscalar, pyrogenically produced yttrium-zirconium mixed oxide, a process for its production, as well as its use.

The production of pyrogenic oxides and mixed oxides by flame hydrolysis of vaporisable metal chlorides or metalloid chlorides is known. (Ullmanns Enzyklopadie der technischen Chemie, 4th Edition, Volume 21, page 44 (1982)).

Also known is a process for producing nanoscalar, pyrogenically produced oxides and/or mixed oxides of metals and/or metalloids, which is characterised in that organometallic and/or organometalloid substances, optionally dissolved in a solvent, optionally in a flame, are converted into the oxides at temperatures of above 200° C. The educts may be organometalloid and/or organometallic pure substances or any mixtures of these, or be used as solutions in organic solvents (EP 001 07 237.0-2111).

Zirconium oxide produced by this process has the disadvantage that the original tetragonal phase rearranges to form the monoclinic phase after a month, even during normal storage. This conversion runs parallel with a volume expansion. Because mouldings are destroyed during this process, the use of these products in ceramic applications is ruled out.

An object, therefore, of the present invention is to produce nanoscalar, pyrogenically produced zirconium oxide which does not have these disadvantages.

SUMMARY OF THE INVENTION

The present invention provides nanoscalar, pyrogenically produced yttrium-zirconium mixed oxide which has a BET surface area of between 1 and 600 $m^2/g$ and a total chloride content of less than 0.05 wt. %, preferably of less than 0.02 wt. %, and does not exhibit a conversion into the monoclinic phase during storage at room temperature, nor even during calcination (ca. 1000° C.). The yttrium-zirconium mixed oxide according to the invention exhibits a stable tetragonal phase. By nanoscalar yttrium-zirconium mixed oxides are meant those having a particle size of equal to or less than 100 nanometers.

The invention also provides a process for producing the nanoscalar, pyrogenically produced yttrium-zirconium mixed oxide, which is characterised in that yttrium compounds and zirconium compounds, optionally dissolved or dispersed in a solvent, are atomized and then converted into the yttrium-zirconium mixed oxide in a flame, preferably an oxyhydrogen flame, at temperatures of above 200° C.

BRIEF DESCRIPTION OF DRAWINGS

The present invention will be further understood with reference to the accompanying drawings, wherein.

DETAILED DESCRIPTION OF INVENTION

Figure 1:
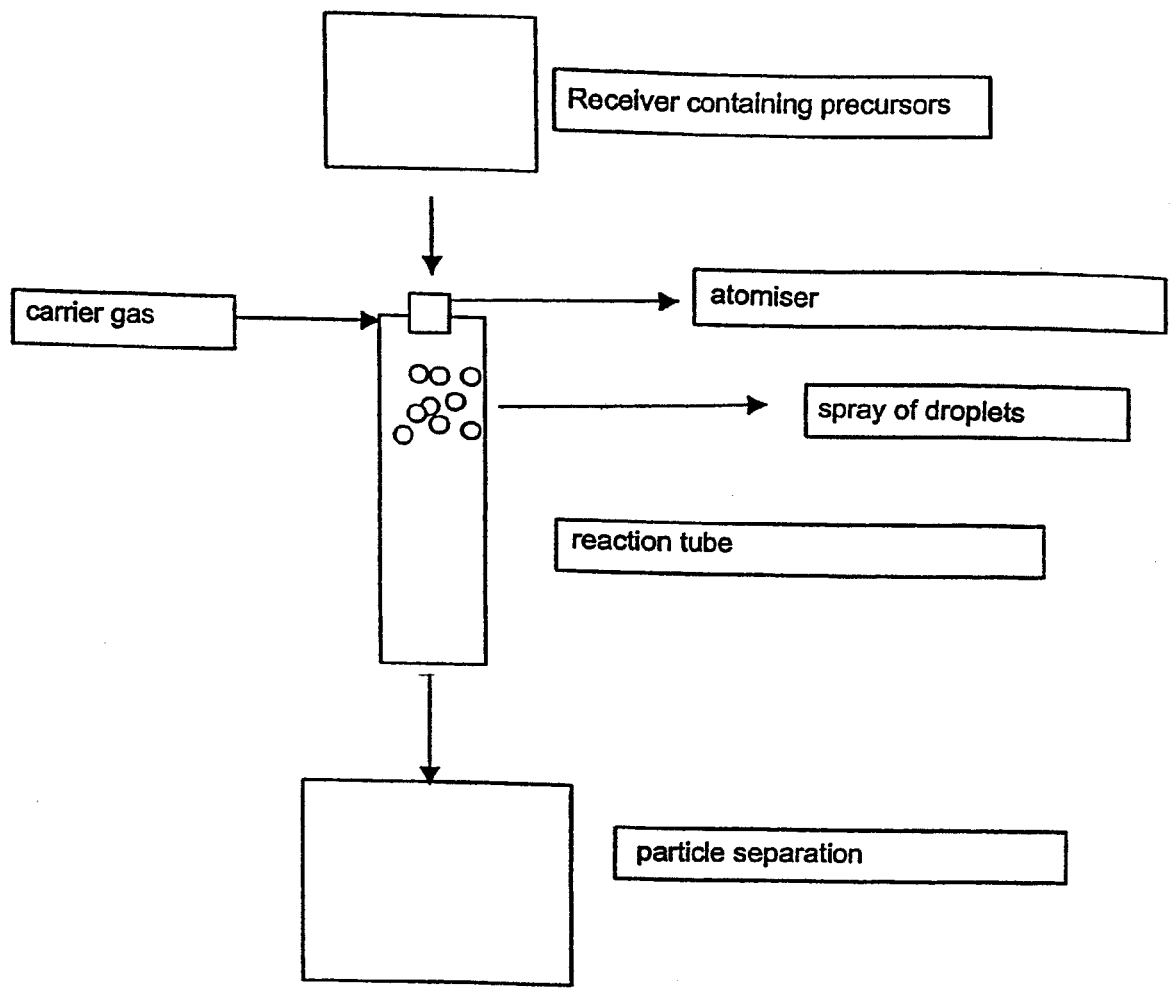
FIG. 1 is a schematic flow diagram illustrating the process of the invention.

The present invention will now be described in further detail.

Suitable compounds of yttrium and of zirconium can be introduced, in the form of a very finely divided liquid spray, into a high-temperature reaction chamber. In the high-temperature reaction chamber, which is designed preferably in the form of a closed flow tube, particle formation can take place at temperatures of above 200° C., possibly with inert or reactive gases being additionally introduced as carrier gas into the high-temperature reaction chamber, and the powder can be recovered by known methods of gas-solid separation, by means of filters, cyclones, washers or other suitable separators.

For this, solutions of organometallic and/or organometalloid substances (precursors) in organic solvents, or even the pure substances (precursors), can be converted into the oxides, optionally in a flame, at elevated temperatures, optionally above 200° C.

The precursors used may be compounds of the type MeR, wherein R represents an organic group such as, for example, methyl, ethyl, propyl, butyl, or the corresponding alkoxy variants.

The solvents used may be organic solvents, such as alcohols, particularly lower alcohols for example, propanol, n-butanol, isopropanol, and/or water.

The zirconium can also be introduced into the flame in the form of an aqueous dispersion of zirconium dioxide.

The precursor can be introduced at a pressure of 1 to 10000 bar, preferably of 2 to 100 bar. Amorphous particles and compact spheres can be produced at a temperature of at least 200° C. Fine particles can be obtained at a temperature of 1800° C. to 2400° C.

An advantage of the process according to the invention is that the precursor can be introduced into the combustion chamber not in gaseous form, but as a liquid. Here, at pressures of up to 10000 bar it is possible, using at least one single-fluid nozzle, to produce a spray of very fine droplets (average size of droplets, depending on the pressure in the nozzle, is from <1-500 μm), which then undergoes combustion and yields the yttrium-zirconium mixed oxide in solid form. At pressures of up to 100 bar, at least one two-fluid nozzle can be used.

The droplets can be produced by using one or more two-fluid nozzles and the gas used in the two-fluid atomization process may be reactive or inert.

The advantage ensuing from the use of a two-fluid nozzle is that the droplets are produced by means of a gas jet. This gas jet may contain oxygen or nitrogen. A very intensive mixing of the oxidizing agent with the precursor can thereby be achieved. An additional supply of fuel can also be introduced into the immediate environment of the droplets, should the precursor be unreactive or the vapour pressure of the precursor not be high enough to ensure a rapid reaction.

Through the use of organometallic precursors in solvents, homogeneous solvent mixtures of various compounds corresponding to the formula MeR (precursor) can be easily prepared in any ratios of concentrations and are passed preferably in liquid form to a flame, in order to obtain the corresponding pyrogenic mixed oxides which are low in chloride. Yttrium-zirconium mixed oxides which, owing to the sharply differing evaporation behavior of the raw materials, previously were difficult to synthesize or could not be synthesized at all, are easily accessible by means of the process according to the invention.

Another advantage of the process according to the invention is that not only can the liquid precursor be mixed with other liquid precursors, but optionally fine particles, for example, pyrogenic oxides such as zirconium oxide, can also be dispersed in the precursor and thereby a coating of the particles dispersed in the precursor can be obtained during the reaction.

The conversion of the precursors into the oxides is carried out preferably in an oxyhydrogen flame. Besides hydrogen, other combustible gases such as, for example, methane, propane, ethane, may be used.

As the organometallic precursors are themselves a good fuel, a further advantage of the process according to the invention is that one can dispense completely with the supporting flame, with a consequent saving of expensive raw materials, for example, hydrogen.

Moreover, the properties of the oxides, for example, the BET surface area, can be influenced by varying the quantity of air (for the combustion) and/or by altering the nozzle variables.

The pyrogenically produced yttrium-zirconium mixed oxide according to the invention can be used as filler, as supporting material, as a catalytically active substance, as the starting material for preparing dispersions, as polishing material for polishing metal discs or silicon discs in the electronics industry (CMP application), as ceramic raw material for gas sensors or in the fuel cell or as dental material or for preparing membranes, in the cosmetics industry, as an additive in the silicone and rubber industry, for adjusting the rheology of liquid systems, for heat stabilization, in the coatings industry, as colored pigment, as heat-insulating material and as an antiblocking agent.

EXAMPLES

The zirconium precursors used, $Zr(NO_3)_4$, $Zr(O-n-C_3H_7)_4$ or zirconium oxide sol, were reacted in a hydrogen flame according to the process described in US 2001/0036437 and US 2003/0206854 which is are relied on and incorporated herein by reference.

Figure 2:
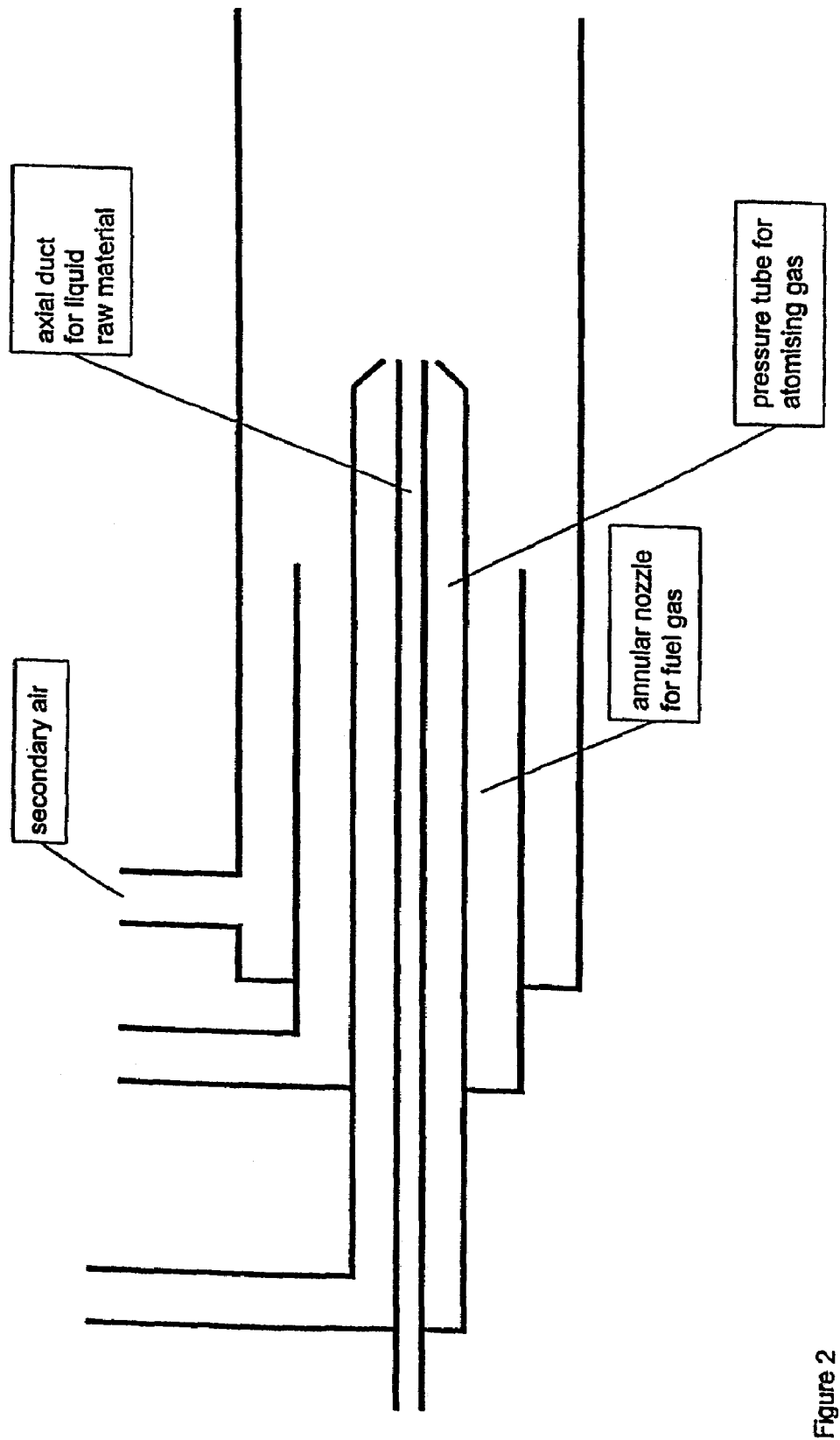
FIG. 2 is a schematic representation of an atomizer nozzle suitable for use in the present invention.

The arrangement of burners which can be used according to the invention is shown diagrammatically in FIG. 2.

The solutions containing the Zr-precursors and Y-precursors as given in Table 1 were atomized into the reaction tube by means of a nozzle, under nitrogen pressure. The reaction tube contained a burning oxyhydrogen flame, consisting of hydrogen and air. The temperature 0.5 m below the flame was 800 to 1000° C. The yttrium-zirconium mixed oxide obtained was removed in filters. The properties of the products obtained are listed in Table 2.

TABLE 1

| Example | Zr-precursor wt. % | Solvent for Zr-precursor | Solution of Y-precursor wt. % | Solvent for Y-precursor | Nozzle |
|---|---|---|---|---|---|
| 1 | $Zr(NO_3)_4$ 15% | $H_2O$ | $Y(NO_3)_3$ 10% | $H_2O$ | 2-fluid |
| 2 | $ZrO_2$ 30% | $H_2O$ | $Y(NO_3)_3$ 10% | $H_2O$/n-propanol | 2-fluid |
| 3 | $Zr(O-n-C_3H_7)_4$ 74% | n-Propanol | $Y(NO_3)_3$ 10% | n-propanol | 2-fluid |
| 4 | $Zr(O-n-C_3H_7)_4$ 74% | n-propanol | $Y(NO_3)_3$ 10% | $H_2O$ | 3-fluid |
| 5 | $Zr(O-n-C_3H_7)_4$ 74% | n-propanol | $Y(NO_3)_3$ 10% | methanol | 3-fluid |

TABLE 2

| Example | BET m²/g a) RT b) 800° C. | Phase a) RT b) 900° C. for two hours | $Y_2O_3$ wt. %, based on the total mixed oxide | Particle size nm (TEM) | Cl content % |
|---|---|---|---|---|---|
| 1 | a) 11 b) 8.4 | a) tetragonal b) tetragonal | 3.5 | 50 | 0.02 |
| 2 | a) 2.4 | a) tetragonal | 5.9 | | 0.01 |
| 3 | a) 60 b) 29 | a) tetragonal b) tetragonal | 3.0 | 12 | 0.02 |
| 4 | a) 43 b) 31 | a) tetragonal b) tetragonal | 5.7 | 20 | 0.01 |
| 5 | a) 68 b) 42 | a) tetragonal b) tetragonal | 5.3 | 14 | 0.01 |

Further variations and modifications of the foregoing will be apparent to those skilled in the art and are intended to be encompassed by the claims appended hereto.

German priority application 101 38 573.0 is relied on and incorporated herein by reference.

We claim:

1. Nanoscalar, pyrogenically produced yttrium-zirconium mixed oxide wherein the amount of $Y_2O_3$ present ranges from 3.0 to 5.7 wt. % based on the total mixed oxide, having a particle size of 12 to 20 nm, a BET surface area of 43 to 60 m²/g and a total chloride content of less than 0.05 wt. % and consists of a stable tetragonal phase which does not exhibit a conversion into the monoclinic phase during storage at room temperature, nor during calcination, wherein yttrium and zirconium compounds are converted into the mixed oxide in an oxyhydrogen flame.

2. A process for producing the nanoscalar, pyrogenically produced yttrium-zirconium mixed oxide according to claim 1, comprising atomizing a yttrium compound and a zirconium compound in a high temperature reaction chamber which is a closed flow tube in an oxyhydrogen flame, optionally dissolved or dispersed in a solvent, and then converting said yttrium compound and said zirconium compound into a yttrium-zirconium mixed oxide in a flame at temperatures of above 200° C.

3. The process according to claim 2 further comprising introducing said yttrium and zirconium compounds as a very finely divided liquid spray into a high temperature reaction chamber.

4. The process according to claim 2 wherein the yttrium compound and the zirconium compound are represented by the formula MeR, wherein Me represents yttrium or zirconium and R represents an organic group.

5. The process according to claim 3 wherein said liquid is water or a lower alcohol.

6. A process for polishing metal discs or silicon discs comprising applying the product of claim 1 to a metal or silicon disc and polishing said disk.

7. A rubber composition comprising rubber and the product of claim 1.

8. A dispersion of the nanoscalar, pyrogenically produced yttrium-zirconium mixed oxides of claim 1.

9. Nanoscalar, pyrogenically produced yttrium-zirconium mixed oxide wherein the amount of $Y_2O_3$ present ranges from 3.0 to 5.7 wt. % based on the total mixed oxide, having a particle size of 12 to 20 nm, a BET surface area of between 43 to 60 $m^2/g$ and a total chloride content of less than 0.05 wt. % and consists of a stable tetragonal phase which does not exhibit a conversion into the monoclinic phase during storage at room temperature, nor during calcination, said mixed oxide having been produced by atomizing a yttrium compound and a zirconium compound in a high temperature reaction chamber which is a closed flow tube in an oxyhydrogen flame, optionally dissolved or dispersed in a solvent, and then converting said yttrium compound and said zirconium compound into a yttrium-zirconium mixed oxide in a flame at temperatures of above 200° C.

* * * * *